(12) United States Patent
Ganz

(10) Patent No.: US 11,535,547 B2
(45) Date of Patent: Dec. 27, 2022

(54) HEATING BURNER FOR PRODUCING AN INTEGRAL BOND BETWEEN COMPONENTS OF QUARTZ GLASS

(71) Applicant: Heraeus Quarzglas GmbH & Co. KG, Hanau (DE)

(72) Inventor: Oliver Ganz, Bruchkoebel (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 10 days.

(21) Appl. No.: 17/176,294

(22) Filed: Feb. 16, 2021

(65) Prior Publication Data

US 2021/0163336 A1    Jun. 3, 2021

Related U.S. Application Data

(62) Division of application No. 16/021,294, filed on Jun. 28, 2018, now Pat. No. 10,947,146.

(30) Foreign Application Priority Data

Jun. 30, 2017 (EP) .................................... 17179002

(51) Int. Cl.
  *C03B 23/207* (2006.01)
  *C03B 37/012* (2006.01)
  (Continued)

(52) U.S. Cl.
  CPC ........ *C03B 23/207* (2013.01); *C03B 23/0086* (2013.01); *C03B 23/043* (2013.01);
  (Continued)

(58) Field of Classification Search
  None
  See application file for complete search history.

(56) References Cited

U.S. PATENT DOCUMENTS

| 2,404,423 A | 7/1946 | Anderson |
| 3,174,531 A | 2/1965 | Walstad |

(Continued)

FOREIGN PATENT DOCUMENTS

| DE | 19858831 | 6/2000 |
| EP | 2008750 | 12/2008 |

(Continued)

OTHER PUBLICATIONS

DE 198 58 831 machine translation, Vosberg et al., Quartz glass melting burner, Jun. 2000 (Year: 2000).*

(Continued)

*Primary Examiner* — Queenie S Dehghan
(74) *Attorney, Agent, or Firm* — Dicke, Billig & Czaja, PLLC

(57) ABSTRACT

Known heating burners for producing a welded joint between components of quartz glass include a burner head in which at least one burner nozzle is formed, a burner-head cooling system for the temperature control of the burner head and a supply line connected to the burner nozzle for a fuel gas. Starting from this, to modify a heating burner in such a way that impurities in the weld seam between quartz-glass components to be connected are largely avoided, it is suggested that the burner head should include a base body of silver or of a silver-based alloy.

10 Claims, 2 Drawing Sheets

(51) Int. Cl.
*C03B 23/00* (2006.01)
*C03B 23/043* (2006.01)
*F23D 14/40* (2006.01)

(52) U.S. Cl.
CPC .. *C03B 37/01205* (2013.01); *C03B 37/01257* (2013.01); *F23D 14/40* (2013.01)

(56) References Cited

U.S. PATENT DOCUMENTS

| | | |
|---|---|---|
| 5,934,206 A | 8/1999 | Saxon et al. |
| 5,950,929 A | 9/1999 | Collier et al. |
| 6,178,779 B1 | 1/2001 | Drouart et al. |
| 2011/0108528 A1 | 5/2011 | Laurisch et al. |
| 2016/0194232 A1 | 7/2016 | Hegde |
| 2017/0044040 A1 | 2/2017 | Madeni et al. |

FOREIGN PATENT DOCUMENTS

| | | |
|---|---|---|
| EP | 2366485 | 9/2011 |
| EP | 2554319 | 2/2013 |
| JP | H10-141613 | 5/1998 |
| JP | 2004-299983 | 10/2004 |
| WO | 2007039426 | 4/2007 |

OTHER PUBLICATIONS

Non-Final Office Action dated Jul. 20, 2020 in U.S. Appl. No. 16/021,294.
Notice of Allowance dated Nov. 16, 2020 in U.S. Appl. No. 16/021,294.

* cited by examiner

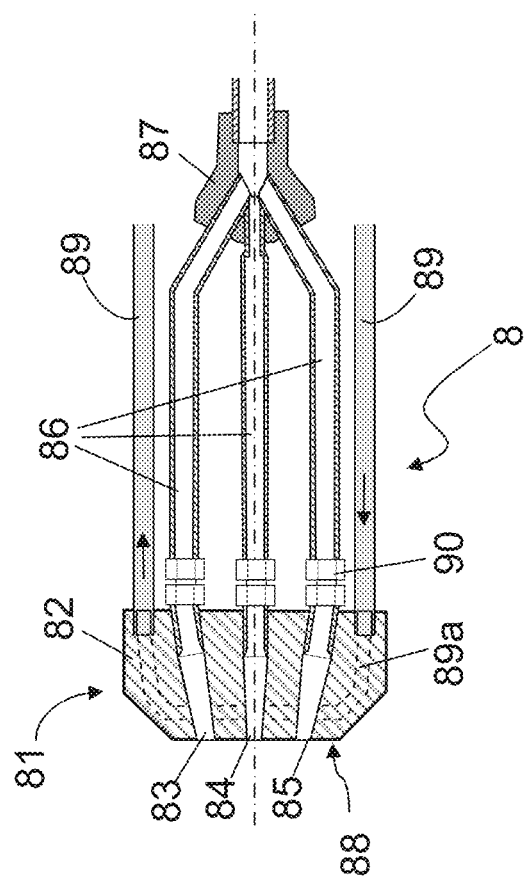
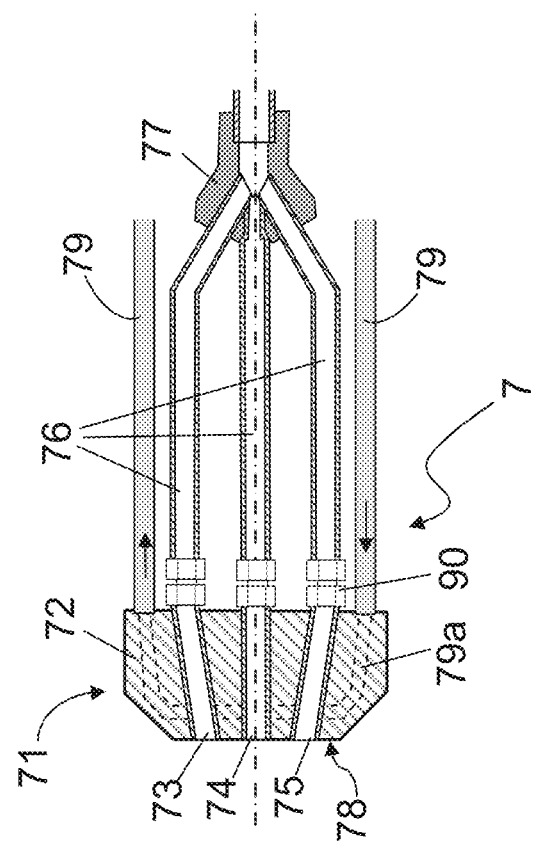
Fig. 3
Fig. 4

HEATING BURNER FOR PRODUCING AN INTEGRAL BOND BETWEEN COMPONENTS OF QUARTZ GLASS

CROSS-REFERENCE TO RELATED APPLICATION

This Utility patent application is a divisional application of U.S. Ser. No. 16/021,294, filed Jun. 28, 2018 and claims priority to Application No. EP 17 179 002.5, filed on Jun. 30, 2017, which is incorporated herein by reference.

BACKGROUND

One embodiment relates to a welding method for connecting a first and a second component of quartz glass by producing an integral bond between connection surfaces of the components, including a heating and softening of the components in the area of the connection surfaces by way of at least one heating burner, pressing the connection surfaces against each other to form a component assembly having a weld seam, and cooling the component assembly.

One embodiment relates to a heating burner for producing a welded joint between components of quartz glass, including a burner head in which at least one burner nozzle is formed, a burner-head cooling system for the temperature control of the burner head and a supply line connected to the burner nozzle for a fuel gas.

The heating burner in the sense of one embodiment serves to supply a fuel gas or a fuel gas mixture to a reaction zone in the form of a burner flame, in which the fuel gas and oxygen react with each other in a combustion reaction and by means of which a workpiece is heated. Burner gases are those gases whose exothermic reaction with each other essentially feeds the burner flame. An oxyhydrogen gas burner is, for example, the burner gases oxygen and hydrogen, and propane and oxygen in a propane gas burner.

Here, quartz glass is understood to mean doped or undoped silica glass with a $SiO_2$ content of at least 85%. Quartz glass components are used for a variety of applications, such as semi-finished products in the manufacture of optical fibers in the form of tubes or solid cylinders, in the manufacture of lamps as cladding tubes, bulbs, cover plates or reflector supports for lamps and emitters in the ultraviolet, infrared and visible spectral range, in chemical apparatus engineering or in semiconductor production in the form of reactors and apparatus made of quartz glass for the treatment of semiconductor components, carrier trays, bells, crucibles, protective shields or simple quartz-glass components, such as tubes, rods, plates, flanges, rings or blocks. To generate special properties, quartz glass is doped with other substances, such as titanium, aluminum, boron or germanium.

A generic method for welding quartz glass components to one another is described in WO 2007/039426 A1. For the butt welding of a hollow cylinder of synthetically produced quartz glass of high purity with a dummy tube of quartz glass of lower purity it is suggested that the hollow cylinder and the dummy tube should be clamped with coaxial central axes in a lathe and moved towards each other by way of the lathe drive, so that they are opposite each other within a muffle tube in the operative area of two heating burners. The front sides of both quartz glass components are jointly heated by way of the heating burners to a temperature of about 2200-2300° C. and are softened, wherein the front surfaces of hollow cylinder and quartz glass tube are simultaneously pressed against each other.

If necessary, a graphite template is pressed against the softened outer surface and the surface is shaped in this process. After cooling an integral bond of the quartz glass components is obtained.

A graphite spatula (purified graphite rod with an inclined treated surface) is used so as to smooth the weld seam, if necessary. Ideally, further treatment is not required after the parts have been pressed together.

A heating burner of the above-mentioned type is known from DE 198 58 831 C2. The propane-oxygen burner consists essentially of a burner head with a burner shaft connected thereto. The burner head includes a one-part block of oxygen-free copper which is provided with three through holes into which a tubular burner nozzle of electropolished and heat-resistant special steel is respectively soldered. Each of the burner nozzles is connected to a tubular piece for the supply of a fuel gas or a fuel gas mixture, which jointly form a burner shaft that carries the burner head. The tubular pieces also consist of electropolished and heat-resistant stainless steel and they terminate in an electropolished and heat-resistant distributor of stainless steel which unites the individual tubular pieces. A cooling-water jacket is integrated into the burner head for cooling burner head and burner nozzles.

EP 2 008 750 A1 refers to a welding torch for tungsten inert gas welding (TIG). In TIG welding, an arc is ignited between the workpiece and a non-melting electrode made of tungsten, which arc melts a filler metal supplied in the form of a wire under protective gas. In the torch head of the welding torch, the upper end of the tungsten electrode is mounted in an electrode holder, which in turn projects into a heat sink. The gas nozzle for the protective gas supply is formed between the outer sheath of the heat sink and an outer cap. The electrode holder is made of a material with low thermal resistance, especially copper, silver or their alloys. EP 2 366 485 A describes a similar welding torch.

Another welding torch for arc welding under protective gas is known from EP 2 554 319 A1. In this process, the plasma is ignited between the workpiece and a weld metal in wire form. The welding wire is fed through the central bore to a replaceable nozzle held on the torch head. Other components of the torch head include a nozzle connection element, a closure element, an unlocking element and a protective cap. It is mentioned that all of these components can be made of silver, namely for the purpose of good electrical conduction of the welding current.

Due to a high temperature and corrosive environment, impurities may form and may be released in the welding process. Particles may here deposit on the quartz glass components to be joined and particularly on the softened connection surfaces and may lead in the further processing of the assembly to bubbles or other flaws on boundary surfaces or even to breakage. In a component assembly which serves as a semifinished product for the manufacture of optical fibers, the transparency of the optical fiber is a decisive quality criterion. Most of the metal components, however, form impurities in quartz glass, the impurities leading to enhanced optical attenuation.

The burner mouth which faces the welding point is exposed to the highest thermal and corrosive loads. Due to erosion of the relatively soft copper the edges of the burner nozzles of stainless steel are here exposed so that these project from the cooled burner block. They may thus get heated to such a high degree that they are glowing, which increases the risk of a flashback.

Therefore, at least one embodiment indicates a method by means of which a solid weld seam can be produced between quartz glass components to be joined, with impurities being largely avoided.

Furthermore, at least one embodiment provides a heating burner suited for performing the method.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3 illustrates a first embodiment of the heating burner in a cut-out and in a perspective representation.

FIG. 4 illustrates a second embodiment of the heating burner in a cut-out and in a perspective representation.

DETAILED DESCRIPTION

Figure 1:
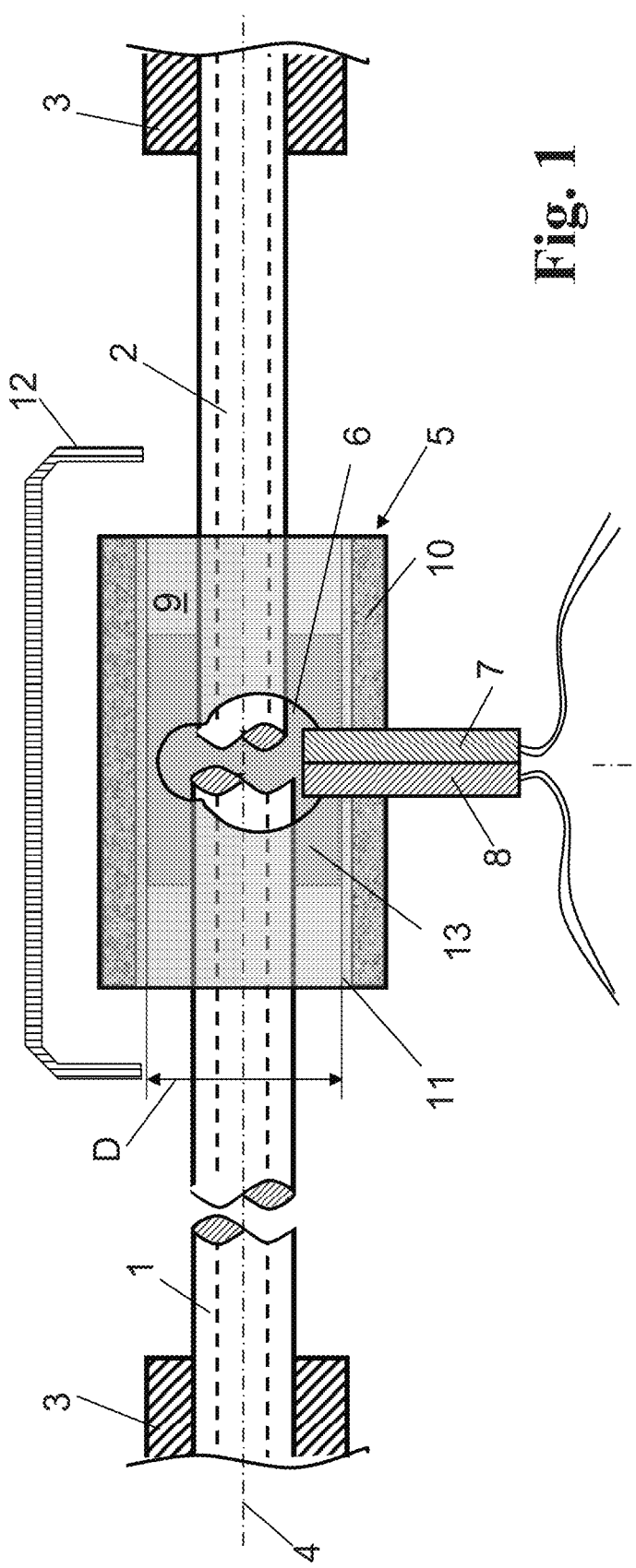
FIG. 1 illustrates an embodiment of the apparatus with an enclosure in the form of a muffle tube in a view on the jacket surface thereof in a schematic representation.

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

One embodiment of welding method is achieved in that that a heating burner with a burner head is used, in which at least one burner nozzle is formed, which is connected to a supply line for a fuel gas or a fuel gas mixture is formed, and which is provided for temperature control with a burner-head cooling system, wherein the burner head includes a base body of silver or of a silver-based alloy.

During the welding process, the components to be connected are heated and softened in the area of their connection surfaces using at least one heating burner, or plural heating burners are used which act simultaneously on the connection surfaces and which, for example, lie opposite one another or are arranged adjacent to one another.

The at least one heating burner has a burner head whose sole or essential component in terms of weight and volume is a coolable base body made of silver or a silver-based alloy.

In the simplest case, the burner head consists exclusively of the base body. The base body can be made up of several parts, but in one embodiment it is integrally made up of one block.

At least one burner nozzle connected to a supply line for a fuel gas or a fuel gas mixture and a burner-head cooling system are formed within the base body made of silver or a silver-based alloy. In the burner-head cooling system, at least two cooling water pipes for the cooling water supply and discharge are connected to each other via a fluidically continuous cooling channel.

For the supply of a fuel gas or a fuel gas mixture, at least one burner nozzle is thus designed in the base body, in one embodiment at least three burner nozzles. Each burner nozzle includes a nozzle opening at the burner mouth, which is in one embodiment formed by a bore in the base body. The nozzle opening may taper towards the burner mouth. The burner mouth is the front side of the burner head facing the welding point.

Silver is characterized by a high thermal conductivity of 430 W/(m·K). It is therefore particularly suitable for rapidly dissipating excess heat from the welding process and the burner head can be relatively easily kept at a temperature below the melting temperature of silver, which is 962° C. The heat sink volume required for sufficient cooling can be comparatively small, so that the base body and thus also the burner head can be less voluminous than with a base body made of copper.

The faster heat dissipation compared to copper, the comparatively low temperature and the potentially smaller volume of the burner head contribute to low erosion and particle generation.

When the burner head erodes, silver-containing compounds such as silver oxide or silver sulfide are formed. These compounds do not make any attenuation contribution in the wavelength ranges typically used for light transmission in telecommunications technology.

The base body is made of silver, which is wholly or at least partly in metallic form, or it is made of a silver-based alloy. The silver-based alloy contains silver as the main alloy component with a weight content of more than 75%. Metallic silver, however, is comparatively soft. For example, to increase its hardness or its melting temperature, the silver-based alloy may contain one or more other metals or one or more compounds, such as oxides, borides, carbides or nitrides. Additional components are metals or compounds from the group including Pd, Pt, Sn, In, Ba, Y, Al, Sr, Ca, Ga, Ge, Mn, Zn, Sn, Sb, the total content of these elements in the silver-based alloy being less than 25% by weight and the balance being silver with production impurities.

However, especially with regard to a low loading of the components to be connected in the area of their connection surfaces with foreign elements, it has proved to be advantageous in one embodiment if a heating burner is used in which the silver content of the burner-head base body is at least 90% by weight, in one embodiment at least 99% by weight.

In a process according to one embodiment, a heating burner is used in which the at least one burner nozzle is made as an insert of silver or a silver-based alloy.

In this case, the burner nozzle consists of a separate insertion part, for example a tubular insertion part, which is inserted into a through hole in the base body. The base body and the burner nozzle can be made of a similar material or of the same material, so that the erosion-related material removal during the welding process does not expose the edge of the nozzle or exposes it less. The risk of heating of the nozzle protruding from the cooled base body is therefore reduced. However, the particularly stressed burner nozzle can also be advantageously made of a silver-based alloy with a higher wear resistance than the base body. In the case of a heating burner with a burner head with several burner nozzles, all burner nozzles are in one embodiment made of silver or a silver-based alloy.

Another, equally preferred embodiment process variant uses a heating burner in which the at least one burner nozzle is designed as a bore in the burner-head base body.

In this case, the burner nozzle does not consist of a separate component, but is formed by an opening in the base body, for example by a through bore in the base body.

It has also proven itself when a heating burner is used in which a burner mouth of the base body facing the connection surfaces is polished.

The polish gives the burner mouth surface a higher reflectivity, which counteracts the heating of the burner head.

It has proven to be advantageous in one embodiment when a heating burner is used in which the connection between the burner nozzle and the gas supply line is designed as a detachable positive connection.

This means that the valuable burner head can be replaced independently of the installation for the supply of the fuel gas or the fuel gas mixture and can be recycled, for example. The positive connection, for example, is designed as a screw connection and is gas-tight.

With regard to the heating burner, the above-mentioned object starting from a heating burner of the type mentioned above is achieved according to one embodiment by the fact that the burner head includes a base body of silver or of a silver-based alloy.

The heating burner according to one embodiment has a burner head whose single or essential component in terms of weight and volume is a base body made of silver or a silver-based alloy. In the simplest case, the burner head consists exclusively of the base body. The base body can be made up of several parts, but it is in one embodiment made up of one block.

At least one burner nozzle connected to a supply line for a fuel gas or a fuel gas mixture and a burner-head cooling system are formed within the base body made of silver or a silver-based alloy. In the burner-head cooling system, at least two cooling water pipes for the cooling water supply and discharge are connected to each other via a fluidically continuous cooling channel.

For the supply of a fuel gas or a fuel gas mixture, at least one burner nozzle is thus formed in the base body, in one embodiment at least three burner nozzles. Each burner nozzle includes a nozzle opening at the burner mouth, which is formed by an insertion part inserted into the base body, but in one embodiment by a bore in the base body. The nozzle opening may taper towards the burner mouth. The burner mouth is the front side of the burner head facing the welding point.

Silver is characterized by a high thermal conductivity of 430 W/(m·K). It is therefore particularly suitable for rapidly dissipating excess heat from the welding process and the burner head can be relatively easily kept at a temperature below the melting temperature of silver, which is 962° C. The heat sink volume required for sufficient cooling can be comparatively small, so that the base body and thus also the burner head can be less voluminous than with a base body made of copper.

The faster heat dissipation compared to copper, the comparatively low temperature and the potentially smaller volume of the burner head contribute to low erosion and particle generation when used in a welding process to produce an integral bond between quartz glass components.

During the erosion of the burner head, silver-containing compounds, especially silver oxide, are formed. These compounds do not make any attenuation contribution in the wavelength ranges typically used for light transmission in telecommunications technology.

The base body consists of silver, which is completely or at least partially in metallic form; it may also contain silver compounds, such as silver oxide. Or the base body is made of a silver-based alloy. This contains silver as the main alloy component with a weight content of more than 75%. Metallic silver, however, is comparatively soft. For example, to increase its hardness or melting temperature, the silver-based alloy may contain one or more other metals or one or more compounds, such as oxides, borides, carbides or nitrides. Additional components are metals or compounds from the group including Pd, Pt, Sn, In, Ba, Y, Al, Sr, Ca, Ga, Ge, Mn, Zn, Sn and Sb, the total content of these elements in the silver-based alloy being less than 25% by weight and the balance being silver with production impurities.

Especially with respect to a low spreading of foreign elements in the intended use of the heating burner, it has proven to be advantageous in one embodiment when the silver content of the burner-head base body is at least 90% by weight, in one embodiment at least 99% by weight.

In one embodiment of the heating burner, the at least one burner nozzle is made as an insert of silver or a silver-based alloy.

In this case, the burner nozzle consists of a separate insertion part, for example a tubular insertion part, which is inserted into a through hole in the base body. Base body and burner nozzle are made of a similar material and especially in one embodiment of the same material, so that the erosion-related material removal during the welding process does not expose the nozzle edge or exposes it less. The risk of heating of the nozzle protruding from the cooled base body is therefore reduced. In the case of a heating burner with a burner head with several burner nozzles, all burner nozzles are in one embodiment made of silver or a silver-based alloy.

In another, equally preferred embodiment of the heating burner, the at least one burner nozzle is designed as a bore in the burner-head base body.

In this case, the burner nozzle does not consist of a separate component, but is formed in the area of the burner mouth by an opening made of the material of the base body, for example by a through hole in the base body.

It has proven itself when a burner mouth of the base body facing the connection surfaces is polished.

The polish gives the burner mouth surface a higher reflectivity, which counteracts the heating of the burner head.

An embodiment of the heating burner has proven to be advantageous, in which the connection between the burner nozzle and the gas supply line is designed as a detachable positive connection.

This means that the valuable burner head can be replaced independently of the installation for the supply of the fuel gas or the fuel gas mixture and can be recycled, for example. The positive connection is achieved, for example, by means of a gas-tight screw connection.

The heating burner according to one embodiment is particularly suitable for carrying out the method according to one embodiment.

Figure 2:
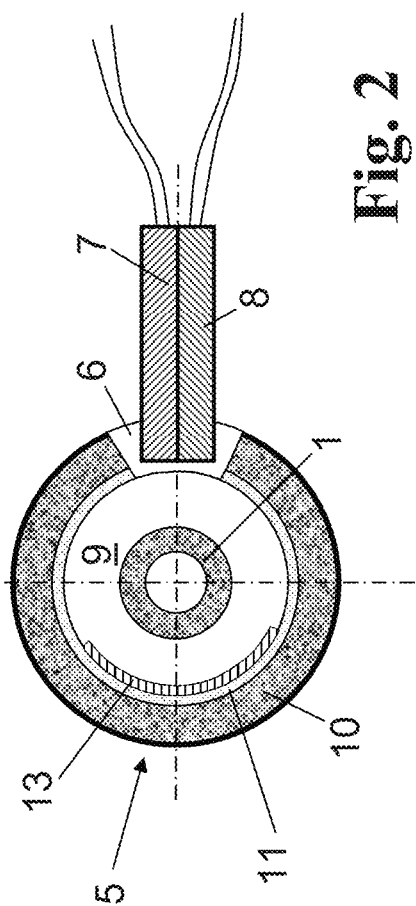
FIG. 2 illustrates the muffle tube according to FIG. 1 in a view on the front side thereof.

The apparatus according to FIGS. 1 and 2 is used to weld a holder in the form of a quartz glass tube 1 to the face of a hollow cylinder 2. The assembly of quartz glass tube 1 and hollow cylinder 2 to be produced is intended to be elongated into a preform for optical fibers or directly to the optical fiber in connection with a so-called core rod which is inserted into the inner bore of the hollow cylinder 2.

The quartz glass tube 1 consists of lower quality quartz glass, which may contain, for example, larger amounts of impurities, bubbles, etc. The quartz glass tube 1 has a slightly thinner wall thickness than the quartz glass cylinder 2 with the same inner diameter. During the elongation process, the hollow cylinder 2 is held in the drawing furnace by means of the quartz glass tube 1 and/or the quartz glass tube 1 is used for drawing during elongation. For this purpose, the hollow quartz glass cylinder 2 is provided with such a quartz glass tube at one end or at both ends.

The apparatus also includes a lathe, in whose chuck 3 the quartz glass tube 1 on the one hand and the hollow cylinder 2 on the other hand are clamped in such a way that their central axes 4 run coaxially to each other and the end faces to be welded are opposite to each other. The heating and softening of the opposite areas of quartz glass tube 1 and hollow cylinder 2 takes place inside a muffle tube 5 made of opaque quartz glass, which has an inner diameter "D" of 400 mm. The muffle tube 5 is made in three parts and is open on both sides. The central part 11 of the muffle tube is provided in its sidewall with an opening 6 through which two heating burners 7, 8 project into the interior 9. It is made of high-purity, opaque quartz glass made of a material that is commercially available under the trade name "OM 100" of Heraeus Quarzglas GmbH & Co. KG, Hanau.

On the side opposite the heating burners 7, 8, the inside of the muffle tube 5 is covered with a simple, half-shell-shaped insertion part 13 made of high-purity quartz glass, which protects the central part 11 of the muffle tube 5 from the effects of heat and which evenly distributes the temperature within the muffle tube 5. A muffle tube insulation 10 also contributes to this.

Above the muffle tube 5 a suction unit 12 is provided, which partially extends along the end-face openings of the muffle tube 5 and by means of which the hot exhaust gas is sucked off.

The two heating burners 7, 8 are identical in construction. Two embodiments are described in more detail with reference to FIGS. 3 and 4.

In the embodiment of FIG. 3, the heating burner 7 has a burner head 71 with an integrated cooling water jacket consisting essentially of a one-piece, block-shaped base body 72 made of high-purity silver (designation: Ag 3N7 with 99.97% Ag) with a copper content of less than 30 ppm by weight. The base body 72 is essentially cuboid with a base area of 60 mm×30 mm and a height of 40 mm, and with an inclination in the direction of the burner mouth 78, whereby the area of the burner mouth 78 and thus the surface facing the burner flame (not illustrated) is reduced. The burner mouth 78 is polished.

Three through holes are drilled in the base body 72, into which internally electropolished small tubes of silver (Ag 3N7) are soldered, which serve as burner nozzles 73, 74, 75 for the supply of a propane-oxygen mixture. Each of the burner nozzles 73, 74, 75 is flush with the burner mouth 78 at one end and is connected at the other end to an internally electropolished tubular piece 76 of stainless steel for the supply of the fuel gas mixture by means of a detachable screw connection 90. These tubular pieces 76 open in the usual manner into a stainless-steel distributor 77, which unites the individual tubular pieces 76 into a common feed tube. In another embodiment, instead of burner nozzles made of high-purity silver (Ag 3N7), those made of a more wear-resistant copper- and nickel-free silver-based alloy such as a silver-palladium alloy are used.

To cool the burner head 71 with the burner nozzles 73, 74, 75, two cooling water pipes 79 are provided for the cooling water supply and discharge, which are connected together in the base body 72 to form a burner-head cooling system. For this purpose, cooling channels 79a have been created in the burner head by drilling appropriate holes. In the nozzle-free areas of the burner head, holes are drilled on the sides facing away from the burner flame, which are connected with cross holes. The openings to the outside are then closed with plugs and soldered. This creates a fluidically continuous channel which penetrates the burner head volume as well as possible along its path.

The embodiment of the heating burner 8 of FIG. 4 differs from that of FIG. 3 in the design of the burner nozzles 83, 84, 85 and in the type of fuel gas and coolant connection.

Here, the burner head 81 also essentially consists of a one-piece, block-shaped body 82 made of pure silver (designation: Ag 3N7 with 99.97% Ag) and the same dimensions as for the embodiment of FIG. 3. The base body 82 is also inclined towards the burner mouth 78 and the burner mouth 78 is polished.

Through-holes are drilled into the base body 82, which at the same time taper slightly conically towards the burner mouth 88 and form the burner nozzles 83, 84, 85. The nozzle openings 83; 84, 85 in the area of the burner mouth 88 are thus made of the material of the green body 82. The through holes have an internal thread into which internally electropolished tubular pieces 86 of stainless steel for the supply of the fuel gas mixture are screwed by means of a screw connection 90. The tubular pieces 86 open into a detachable stainless-steel distributor 87, which unites the individual tubular pieces 86 into a common feed pipe.

To cool the burner head 81 with the burner nozzles 83, 84, 85, two cooling water pipes 89 are provided for the cooling water supply and discharge, which are also screwed into the bores of the base body 82 and which are connected together in the base body 82 to form a burner-head cooling system. For this purpose, corresponding holes have been drilled in the base body 82, which form a fluidically continuous cooling channel 89a.

In this embodiment of the heating burner 8, the burner head 81 is thus connected to all media lines (86; 89) by means of a thread and can therefore be easily detached. The burner head 81 can thus be easily replaced and recycled and the media supply system (86; 87, 89) can be further used.

In the following, the method according to one embodiment is explained in more detail using the figures.

The quartz-glass hollow cylinder 2 is manufactured by flame hydrolysis of a silicon-containing starting substance using the well-known OVD process. It has an outer diameter of 200 mm and an inner diameter of 50 mm. To produce a welded joint with a quartz glass tube 1 made of quartz glass of lower purity, hollow cylinder 2 and quartz glass tube 1 with coaxial central axes 4 are clamped into the chuck 3 of the lathe and moved towards each other by means of the lathe drive so that they face each other within the muffle tube 5 in the area of action of the heating burners 7, 8. The end-face areas facing the welding point are heated to a temperature of about 2200 to 2300° C. by means of the heating burners 7, 8 and softened. A surface area with an extension of about 150 to 200 mm is thereby flame-polished on both sides of the weld seam to be produced. At the same time, the end faces of hollow cylinder 2 and quartz glass tube 1 are pressed against each other. An oxygen stream is conducted through the holes of hollow cylinder 2 and quartz glass tube 1.

The use of the heating burners 7, 8 according to one embodiment with a base body (72; 82) made of silver ensures faster heat dissipation compared to a base body made of copper, which results in a comparatively lower temperature and thus low erosion and particle generation. The silver-containing oxide or sulfide compounds formed by erosion of the base body (72; 82) have no significant effect on the attenuation of the optical fibers produced from the hollow cylinder.

Static tensile strength measurements illustrated that no breaks occurred in the area of the welding point, even if the maximum test load of 3 tons was applied.

In an alternative procedure, which has proven to be particularly suitable for welding large components, the heating burners 7, 8 are not arranged parallel to each other, but are distributed around the wall of the muffle tube 5 in the area of the connection surfaces on both sides. This distributes the heat effect of the heating burners 7, 8 over a larger surface area of the muffle tube 5, thus reducing its thermal load. The heating burners 7, 8 can, for example, be located opposite each other on the wall of the muffle tube.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof

What is claimed is:

1. A heating burner for producing a welded joint between components of quartz glass, comprising:
   a burner head in which at least one burner nozzle is formed;
   said burner head comprises a base body of silver or of a silver-based alloy;
   a burner-head cooling system for the temperature control of the burner head;
   wherein in said burner-head cooling system two cooling water pipes for a cooling water supply and cooling water discharge are connected to each other via a fluidically continuous cooling channel; and
   a supply line connected to the burner nozzle for a fuel gas or a fuel gas mixture;
   wherein in said base body at least one burner nozzle is designed as a tubular insertion part of silver or of a silver-based alloy, that is inserted into a through hole in the base body.

2. The heating burner of claim 1, wherein the silver content of the base body of the burner head is at least 90% by wt.

3. The heating burner of claim 1, wherein the silver content of the base body of the burner head is at least 99% by wt.

4. The heating burner of claim 1, wherein a burner mouth which faces the connection surfaces is polished.

5. The heating burner of claim 1, wherein the connection between burner nozzle and gas supply line is configured as a detachable positive connection.

6. A heating burner for producing a welded joint between components of quartz glass, comprising:
   a burner head in which at least one burner nozzle if formed;
   the burner head comprising a base body of silver or of a silver-based alloy;
   a burner-head cooling system for the temperature control of the burner head;
   wherein in said burner-head cooling system two cooling water pipes for a cooling water supply and cooling water discharge are connected to each other via a fluidically continuous cooling channel; and
   a supply line connected to the burner nozzle for a fuel gas or a fuel gas mixture;
   wherein in said base body the at least one burner nozzle is designed as a bore in the base body of the burner head.

7. The heating burner of claim 6, wherein the silver content of the base body of the burner head is at least 90% by wt.

8. The heating burner of claim 6, wherein the silver content of the base body of the burner head is at least 99% by wt.

9. The heating burner of claim 6, wherein a burner mouth which faces the connection surfaces is polished.

10. The heating burner of claim 6, wherein the connection between burner nozzle and gas supply line is configured as a detachable positive connection.

* * * * *